United States Patent
Pines et al.

(10) Patent No.: US 6,938,853 B2
(45) Date of Patent: Sep. 6, 2005

(54) BIOMIMETIC MECHANISM FOR MICRO AIRCRAFT

(75) Inventors: Darryll J. Pines, Clarksville, MD (US); Felipe A. Bohorquez, College Park, MD (US); Jayant Sirohi, Greenbelt, MD (US)

(73) Assignee: University of Maryland, College Park, College Park, MD (US)

( * ) Notice: Subject to any disclaimer, the term of this patent is extended or adjusted under 35 U.S.C. 154(b) by 275 days.

(21) Appl. No.: 10/387,494

(22) Filed: Mar. 14, 2003

(65) Prior Publication Data

US 2004/0056149 A1 Mar. 25, 2004

Related U.S. Application Data

(60) Provisional application No. 60/364,627, filed on Mar. 15, 2002.

(51) Int. Cl.⁷ ............................................... B64C 33/00
(52) U.S. Cl. .......................... 244/11; 244/22; 244/72; 446/35
(58) Field of Search .............................. 244/11, 22, 72; 446/34, 35

(56) References Cited

U.S. PATENT DOCUMENTS

| | | | |
|---|---|---|---|
| 5,915,650 A | | 6/1999 | Petrovich |
| 6,082,671 A | * | 7/2000 | Michelson .................. 244/72 |
| 6,206,324 B1 | | 3/2001 | Smith |
| 6,227,483 B1 | | 5/2001 | Therriault |
| 6,277,483 B1 | | 8/2001 | Peinemann et al. |
| 6,565,039 B2 | * | 5/2003 | Smith ........................ 244/72 |
| 2002/0117583 A1 | * | 8/2002 | Hamamoto et al. ........... 244/72 |

OTHER PUBLICATIONS

"Titanium–Alloy MEMS Wing Technology for A Micro Aerial Vehicle Application", Pronsin–Siriak et al.

"Wing Transmission for a Micromechanical Flying Insect", Fearing et al, Proceedings of the 2000 IEEE International Conference on Robotics & Automation, San Francisco, CA, Apr. 2000, pp 1509–1516.

"Wing Rotation and the Aerodynamic Basis of Insect Flight", Dickinson, et al, Article from Science Magazine, vol. 284, www.sciencemag.org, Jun. 18, 1999, pp 1954–1960.

* cited by examiner

Primary Examiner—J. Woodrow Eldred
(74) Attorney, Agent, or Firm—Squire, Sanders & Dempsey, L.L.P.

(57) ABSTRACT

A biomimetic pitching and flapping mechanism including a support member, at least two blade joints for holding blades and operatively connected to the support member. An outer shaft member is concentric with the support member, and an inner shaft member is concentric with the outer shaft member. The mechanism allows the blades of a small-scale rotor to be actuated in the flap and pitch degrees of freedom. The pitching and the flapping are completely independent from and uncoupled to each other. As such, the rotor can independently flap, or independently pitch, or flap and pitch simultaneously with different amplitudes and/or frequencies. The mechanism can also be used in a non-rotary wing configuration, such as an ornithopter, in which case the rotational degree of freedom would be suppressed.

20 Claims, 9 Drawig Sheets

BIOMIMETIC MECHANISM FOR MICRO AIRCRAFT

CROSS-REFERENCE TO RELATED APPLICATIONS

This nonprovisional application claims the benefit of U.S. Provisional Application No. 60/364,627, filed Mar. 15, 2002.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract number N6T2-52273 awarded by NASA.

BACKGROUND OF THE INVENTION

1. Field of the Invention

The invention relates to a biologically inspired pitching and flapping mechanism for small-scale flight. The mechanism allows for a micro aircraft to harness some of the unsteady aerodynamic mechanisms that can be found in biological small-scale flyers, such as insects and small birds.

2. Description of the Related Art

Figure 1:
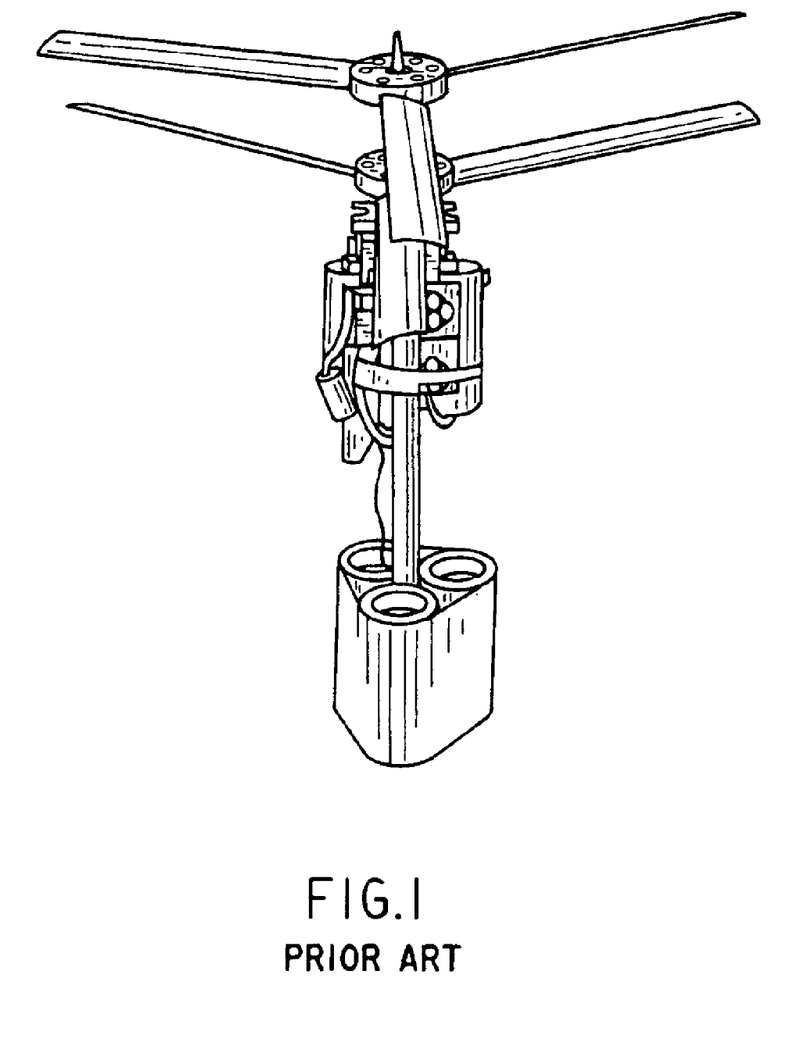
FIG. 1 illustrates the MICOR prototype of the prior art.

Over the last several years, the Micro Air Vehicle (MAV) program sponsored by the Defense Advanced Research Projects Agency (DARPA) developed a series of successful fixed wing aircrafts, such as the Black Widow (Aerovironment) and the Microstar (Lockheed Martin). These vehicles demonstrated satisfactory performance for a limited type of reconnaissance mission. As specified by DARPA's initial requirements, all the vehicles have dimensions no larger than six inches and weigh between 80 and 110 grams. The vehicles can fly for approximately 30 minutes while carrying about 20 grams of payload. The size constraints of the vehicles make them one order of magnitude smaller than previously developed systems. As such, the vehicles are required to operate under low Reynolds number aerodynamic flow conditions (between 5,000 and 50,000Re). The applicability of the fixed wing MAVs is greatly reduced by inadequate performance characteristics such as the lack of hover capability, poor maneuverability in tightly constrained environments, and the inability for multiple takeoffs and landings during a single mission. These performance characteristics become important when a specific mission requires the surveillance of a target from a fixed location, for example, from the top of a building in an urban environment. In such a mission, it would be necessary for the vehicle, after reaching the target, to land without interrupting data transfer, thereby saving energy and increasing the system's versatility and potential mission duration. If the target moves, the vehicle could take off and relocate to a new position. Rotary wing vehicles fill the gap left by their fixed wing counterparts, offering the necessary characteristics required for these types of missions. Nevertheless, hovering capability comes at a price, since the energy requirements of a rotorcraft in hover are almost double that of a fixed wing aircraft of similar weight in cruise. The University of Maryland's Alfred Gessow Rotorcraft Center developed a MIcro COaxial Rotorcraft (MICOR), which is an electrically driven, battery powered coaxial helicopter weighing about 100 grams. See FIG. 1. The six-inch diameter three bladed rotors use 8% cambered curved plate airfoils and have a solidity of 0.1068. Rotor performance was evaluated and a maximum hover efficiency or Figure of Merit (FM) of 42% was obtained using a 10% linear twist in the blades.

The aerodynamic performance of the MICOR rotors was poor considering that full-sized helicopters have an FM between 70 and 85%. The modest FM values obtained can be explained by the low Reynolds number flow conditions that the rotors encounter (approximately 30,000 in hover). Under these flow conditions the viscous forces dominate over the inertial forces, reducing the maximum lift coefficient and greatly increasing the profile drag, and thus, power consumption. The reduced airfoil performance and the limited power density of the batteries yielded a hover endurance of only 3 minutes. Under low Reynolds number flow conditions there is little that can be done to improve the efficiency of a conventional rotor, because all airfoils will suffer similar performance deterioration. Other sources of inefficiency such as tip losses and wake swirl are marginally reduced by optimizing the rotor's main design parameters (solidity, number of blades, blades shape etc.). Thus, there is a need to provide a rotary wing aircraft that has improved airfoil performance, hovering capabilities and maneuverability in order to perform complex surveillance.

The inventors of the present invention have observed that at low Reynolds numbers, such as 30,000 and below, flying insects and some small birds have remarkably high lift forces. Wind tunnel tests and analytical models of insect wings show that under a steady flow with no wing actuation, aerodynamic forces are smaller than those required for active flight. Complex animal wing motion can be categorized into three main basic movements: flapping, pitching and translation. Resultant wing movement produces a series of lift enhancing aerodynamic mechanisms: delayed stall, rotational circulation and wake capture. While aerodynamic mechanisms such as wake capture and rotational lift have been observed in insects' flight, few if any manmade miniature flying machines make any attempt at harnessing these mechanisms. Two exceptions to this include Caltech's Microbat and U.C. Berkeley's micro-robotic flying device.

The Microbat is an ornithopter type vehicle, in that it has flapping wings to generate the required lift and thrust. The Microbat uses a lightweight, low-friction transmission mechanism to convert the rotary motion of a driving electric motor into the flapping motion of the wings. The transmission design restricts the flapping motion in a plane perpendicular to the motor shaft. A small DC motor is used to drive the transmission. The Microbat transmission design can only be used in an ornithopter configuration, and has only one degree of freedom, specifically, the wings only flap. The dimensions of the mechanism determine the amplitude of the flapping and the amplitude is fixed for a given prototype. The Microbat further lacks the rotational and pitching degrees of freedom as well as the variable amplitude of the movements of the present invention.

The U.C. Berkeley micro-robotic flying device uses separate four-bar frames to control the leading and trailing edges of a fanfold compliant wing. The device works exclusively in an ornithopter configuration. Actuation of the device is performed by the use of a piezoelectric unimorph with small angle deflection. The device provides pitching and flapping degrees of freedom to a flexible wing, however the pitching and the flapping are coupled. Thus, a rigid wing cannot be used, since it would over-constrain the device.

Figure 2:
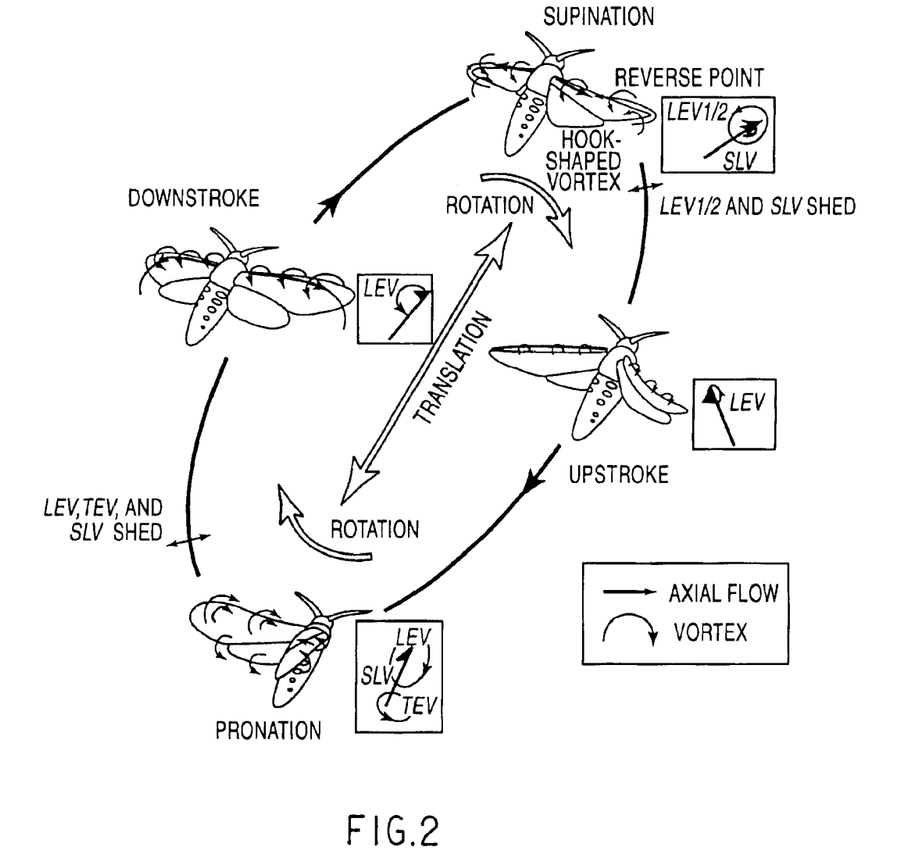
FIG. 2 is a diagram of a vortex system during the complete wingbeat cycle of a flying insect or a small bird.

Insects use various types of unsteady mechanisms depending on the different flow conditions their wings encounter. A typical wing beat cycle can roughly be divided into four different stages: downstroke, supination, upstroke, and pronation. These four stages are illustrated in the FIG. 2 diagram of the vortex system during the complete wingbeat cycle. (H. Liu, et al. "A Computational Fluid Dynamic Study of Hawkmoth Hovering," J. of Exp. Bio, 201, 461–477, 1998). The shaded area at pronation denotes the morphological lower wing surface on the insect diagram (insets). A large leading-edge vortex (LEV) with strong axial flow is observed during the downstroke. This LEV is still present during supination, but turns into a hook-shaped vortex. A small LEV is also detected during the early upstroke, and gradually grows into a large vortex in the latter half of the upstroke. This LEV is still observed closely attached to the wing during the subsequent pronation, where a trailing-edge vortex (TEV) and a shear-layer vortex (SLV) are also formed, together forming a complicated vortex system. Downstroke and upstroke are translational movements, where the wings advance through the air at high angles of attack. Supination and pronation correspond to rapid rotational movements at the end of the downstroke and upstroke respectively. The wing rotation inverts the upper and lower surface of the wing keeping a positive angle of attack during the translational phases. There are three main unsteady aerodynamic effects: delayed stall, rotational circulation, and wake capture. These effects are briefly described below.

Delayed stall can be similar to the dynamic stall found in full size helicopters. In a delayed stall, the blades in the retreating side encounter high angles of attack and when the airfoil exceeds the stall angle, a leading edge vortex is formed. This vortical disturbance increases the suction pressure and thus, the overall lift of the wing as long as it remains attached to the upper surface. However the pitching moment and the lift-to-drag ratio are negatively affected. As soon as the vortex is created, it starts convecting downstream towards the trailing edge until it is shed, leaving a separated flow on the airfoil and canceling all additional lift production. The angle of attack at which reattachment occurs is usually below the static stall angle so the phenomenon exhibits hysteresis. The overall effect of dynamic stall on the rotor's performance depends on several factors including reduced frequency, Mach number, mean angle of attack, and airfoil design. During the flight of an insect, when dynamic stall occurs and the leading edge vortex is created, an axial flow on the wing stabilizes the vortex, reducing the convection speed towards the trailing edge and thus allowing additional lift production through the entire downstroke and upstroke. The axial flow on the wing is produced by the pressure gradient between the root and the tip of the wing due to the flapping and lead-lag movements. Due to the extended time the vortex stays attached to the airfoil, the phenomenon is referred to as delayed stall.

Rotational circulation and wake capture are unsteady mechanisms associated with the rotational portions of the wingbeat cycle. On a rotating cylinder, the pressure on the high velocity side will be lower than the pressure on the low velocity side. Hence, a pressure difference exists, causing a side thrust or lift on the cylinder. However, insect wings are not circular in cross-section, so the resultant lift is perpendicular to the surface during the rotation. Insects rotate their wings just before stroke reversal occurs in order to create an upward force because lift orientation is dependent upon the relative direction of the incoming flow and the wing's rotation. Just after stroke reversal and before any significant translational speed is reached, an additional transient lift production has been identified. This phenomenon is known as wake capture, in which the wings use the shed vorticity of the previous stroke to enhance its lift. The flow generated by a translational phase, either upstroke or downstroke, increases the effective fluid velocity of the next one, raising the thrust levels above the ones found in translation alone.

In order to harness the unsteady lift mechanisms used by most insects, the inventors of the present invention have developed a biologically inspired flapping/pitching mechanism in conjunction with the rotary wing concept. This mechanism replicates some of the aerodynamic phenomena that enhance the performance of small fliers, replacing the periodic translational motion with a unidirectional circular motion while actively flapping and pitching the rotor blades. The present invention is novel as it is directed to a rotating rotor that can undergo large-scale pitching and flapping motions at high frequencies. Further, the present invention uses some of the aforementioned unsteady phenomena in a pitching and flapping mechanism to improve the aerodynamic performance of a small-scale rotary wing aircraft.

SUMMARY OF THE INVENTION

In one embodiment, the present invention includes a biomimetic pitching and flapping mechanism that includes a hub or support member, and at least two blade joints for holding blades mounted on the support member. There is an outer shaft member concentric with and supported within the support member. An inner shaft member is concentric with and supported within the outer shaft member. Each of the at least two blade joints include a flapping member being coupled to the outer shaft member, and a pitching member being coupled to the inner shaft member. The flapping member and pitching member are uncoupled and actuated independently of each other.

In accordance with another embodiment of the invention, there is a method of making a biomimetic pitching and flapping mechanism. The method includes providing a hub or support member. At least two blade joints are mounted onto the support member. Each of the blade joints includes a flapping member for flapping the blade joints and a pitching member for pitching the blade joints. An outer shaft can be slidingly concentric within the support member. An inner shaft can be slidingly concentric within the outer shaft.

In accordance with another embodiment of the present invention, a biomimetic pitching and flapping mechanism includes supporting means for supporting at least two blade joints. Each of the at least two blade joints includes a flapping member for flapping the blade joints and a pitching member for pitching the blade joints. The flapping member and pitching member are uncoupled and actuated independently of each other. There is also a first moving means for moving the flapping member in a vertical direction and a second moving means for moving the pitching member in an angular direction. A first coupling means couples the flapping member to the first moving means and a second coupling means couples the pitching member to the second moving means.

In accordance with another embodiment of the present invention, a biomimetic pitching and flapping mechanism a support member and at least two blade joints for holding blades, mounted on the support member. An outer shaft member is concentric with and supported within the support member and an inner shaft member is concentric with and supported within the outer shaft member. The blade joints include a first moving member coupled to the outer shaft member for lifting the blades joints, and a second moving member coupled to the inner shaft member for tilting the blade joints. The first moving member and the second moving member are uncoupled and actuated independently of each other.

BRIEF DESCRIPTION OF THE DRAWINGS

The objects and features of the invention will be more readily understood with reference to the following description and attached drawings, wherein.

DETAILED DESCRIPTION OF THE INVENTION

Figure 3:
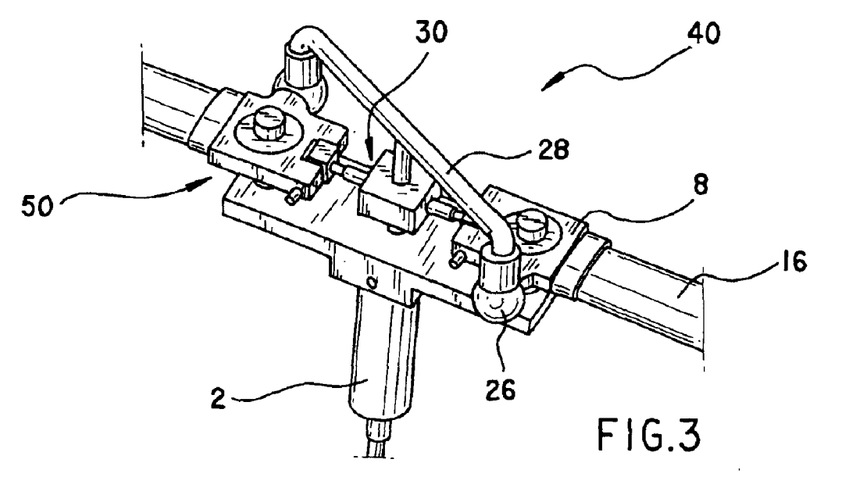
FIG. 3 illustrates a perspective view of a pitching and flapping mechanism according to the present invention.
Figure 4:
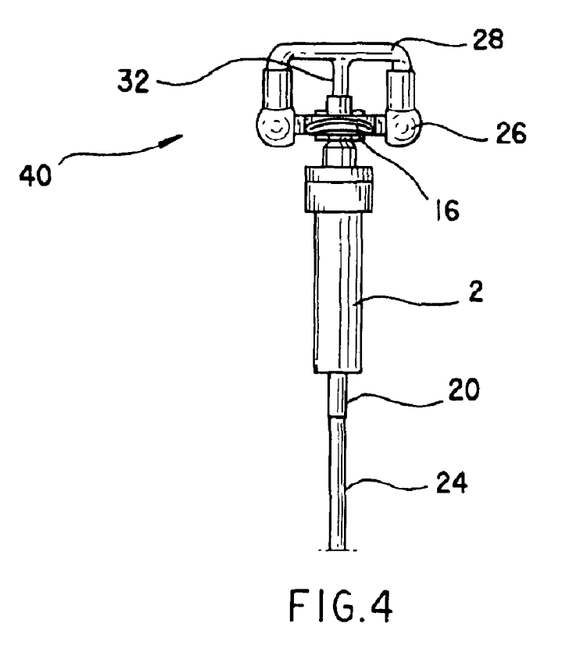
FIG. 4 illustrates a side view of a pitching and flapping mechanism according to the present invention.
Figure 5A:
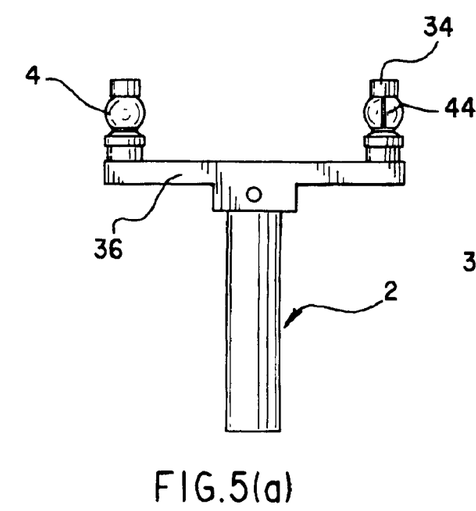
FIGS. 5(a) and 5(b) illustrate one example of a hub according to the present invention.
Figure 5B:
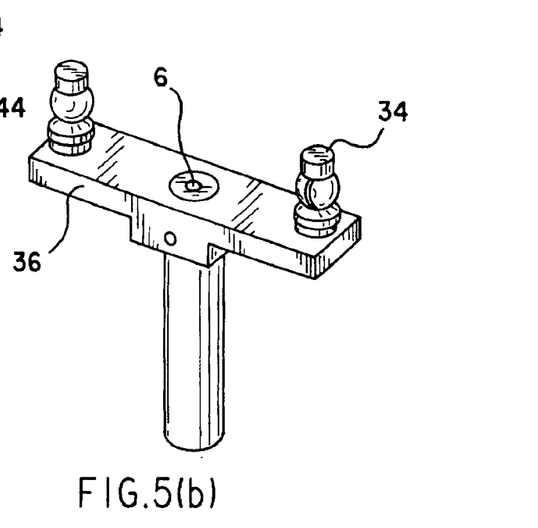

The components of an assembled pitching and flapping mechanism 40 shown in FIGS. 3 and 4 include a hub 2, a blade joint 8, an outer shaft member 30, and an inner shaft member 32 with the hub serving as a base to which the blade joints, outer shaft member and inner shaft member are supported. The hub 2 can be T-shaped as illustrated in FIGS. 5(a) and 5(b), and include ball joints 4 which are fixed to the hub 2 by vertical screws 34. The ball joints 4 can be in the form of spheres disposed at opposite ends of an upper portion 36 of the hub 2. The hub 2 also includes a linear bearing 6 passing through an opening in the upper portion 36 and centrally located between the ball joints 4. See FIG. 5(b). The linear bearing 6 serves to slidingly support the outer shaft member 30 of the mechanism 40 in a straight direction through an elongated lower portion of the hub 2.

Figure 6A:
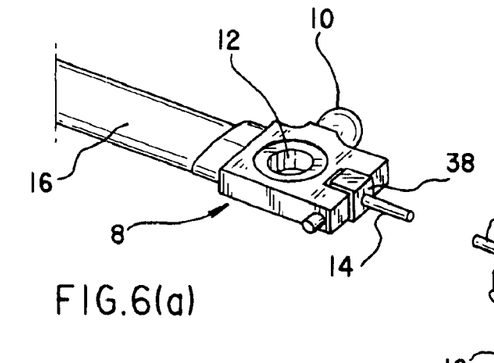
FIGS. 6(a) and 6(b) illustrate one example of blade joints according to the present invention.
Figure 6B:
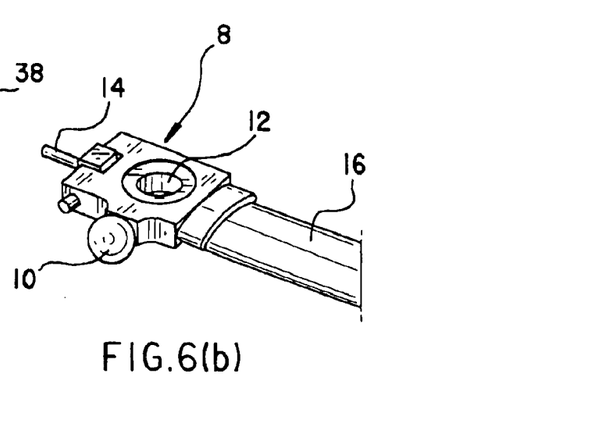
Figures 11A, 11B:
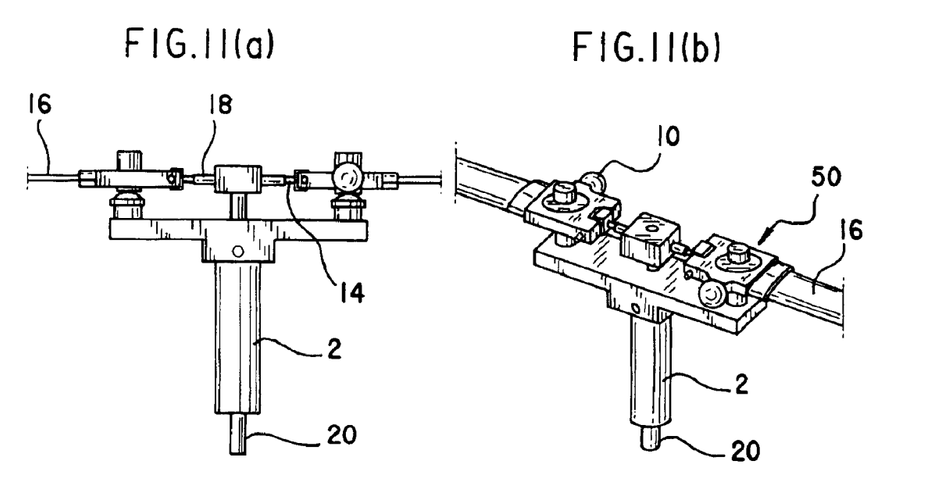
FIGS. 11(a) and 11(b) illustrate one example of a hub, blade joints and outer shaft according to the present invention.
Figure 13:
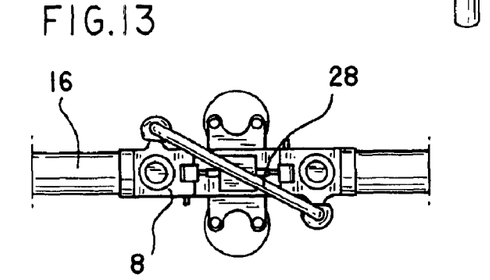
FIG. 13 illustrates a top view of a pitching and flapping mechanism according to the present invention.

The coupling of the blade joint 8 to the hub 2 forms a spherical joint 50, shown in FIG. 3. As shown in FIG. 6, a pair of blade joints 8 hold the blades 16 and provide the degrees of freedom required for pitching and flapping of the blades about the spherical joint 50. Each blade joint 8 includes a female portion 12, a hinge 38, a flap link or sliding pin 14, and a spherical bolt 10. The spherical bolt 10 can be a bolt that has a sphere for a head and can serve as the portion of the spherical joint 50 to which the inner shaft member 32 can be attached. The blades 16 are attached to the hub 2 as illustrated in FIGS. 11(a) and 11(b), through the female portions 12 of the blade joints 8. The spherical bolt 10 of the blade joint is perpendicular to the sliding pin 14 so that a pitch link 28 of the inner shaft member 32 connected to the spherical bolt 10 can be placed at an angle of about 35° with respect to the sliding pin 14. See FIG. 13. Although the rotary wing aircraft of the present invention is illustrated with a two-bladed rotor, the configuration allows any number of blades to be mounted to the hub. In the present invention, the phase shift between the flapping and the pitching oscillations can be adjusted from 0 to 360° over a wide range of rotational speeds. As such, desired flapping and pitching amplitudes can be easily attained.

As noted above, the ball joint 4 can be fixed to the hub 2 by a vertical screw 34 and the blades 16 are attached to the hub 2 through the blade joints 8. However, this assembly tends to create an additional degree of freedom, resulting in undesirable lead/lag. To rectify the lead/lag, a vertical groove 44 can be provided on the ball joint to hold a pin attached to the pitch link 28 and thereby avoid misalignment of the pitch link 28 on the blade joint 8. As a result, pitching and flapping can be uncoupled and independent of each other because the blade 16 can be rotated around the perpendicular axes of the sliding pin 14 and spherical bolt 10, which cross each other at the center of the ball joint 4 attached to the hub 2.

The uncoupled feature of the pitching and flapping mechanism provides that when different combinations of degrees of freedom in the mechanism are actuated, any amplitude and frequency for the pitching and flapping movements can be obtained. In addition, any phase shift between the pitching and flapping movements can be achieved. The independent actuation of the pitching and flapping mechanisms allows the blades to perform a flapping, pitching, or rotating movement. Further, the blades can be actuated by any combination of two these aforementioned movements, or all three movements simultaneously.

The mechanism can be used in a rotary-wing configuration in a number of ways. For example, pitching, rotation and flapping can be actuated simultaneously. Alternatively, pitching and flapping can be actuated either independently or simultaneously. When pitching and/or flapping are actuated without powered rotation, the rotational motion of the blade assembly results from the aerodynamic forces produced by the pitching and flapping movements. In that case, the rotor of the present invention has the advantage of not requiring an anti-torque device including a counter rotating rotor or tail rotor, which would be necessary to counteract the torque given to the rotor when it is actively actuated.

Figure 16:
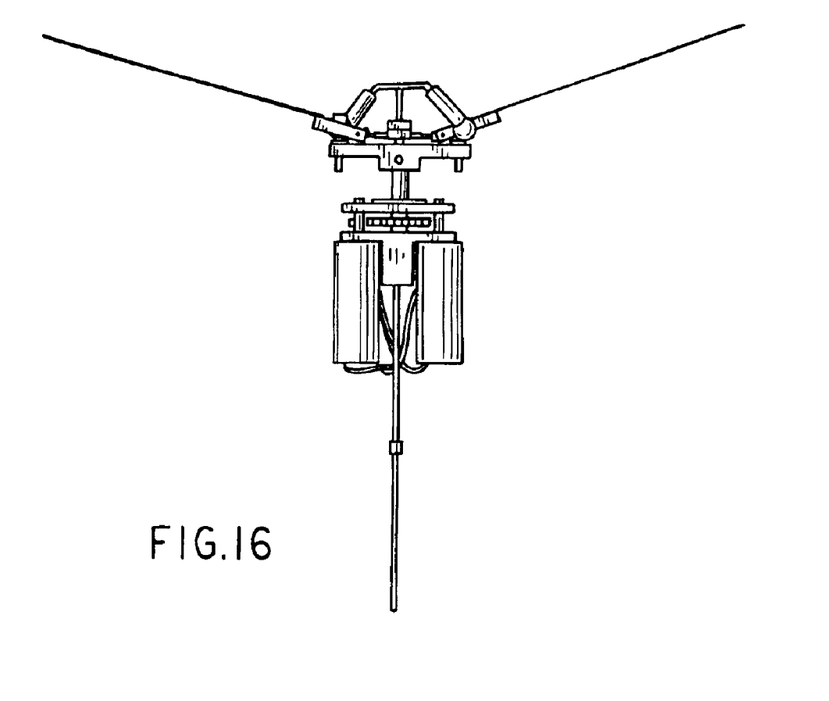
FIG. 16 shows a pitching and flapping mechanism at a large flap angle according to the present invention.

Since the actuation can be performed while rotating, actuation forces can be transferred to the hub 2 through coaxial shafts 30, 32 that run inside the main rotational axis. In the present invention, collective pitch actuation is performed. Collective pitch actuation changes the angle of attack of all the blades at the same time to control the thrust. The mechanism 40 is configured so that small linear vertical displacements of the inner shaft member 32 and outer shaft member 30 can generate large amplitude pitching and/or flapping motions. As long as the shafts are actuated independently, pitch and flap will be uncoupled. FIG. 16 shows the mechanism with a large flap angle.

Figure 14:
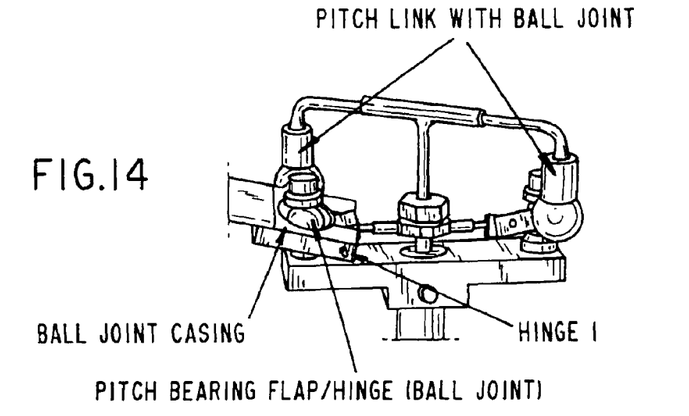
FIG. 14 shows the rotation and translation motion of blade joints according to the present invention.

As actuation is produced in the pitching/flapping mechanism, the points where the pitch and flap links are attached to the ball joint 4 describe arcs. For the pitch link, a simple ball joint 4 can be used, while for the flap link 14 a steel wire inside a tube 18 can be coupled to the hinge 38 to allow rotation and translation of the main ball joint housing. See FIG. 14.

Figure 7A:
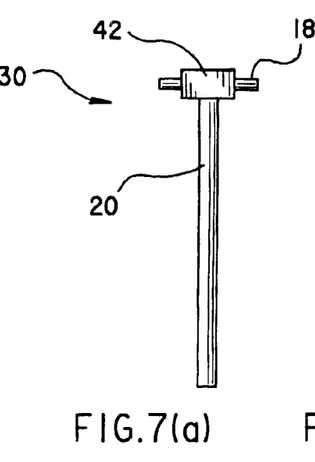
FIGS. 7(a) and 7(b) illustrate one example of an outer shaft according to the present invention.
Figure 7B:
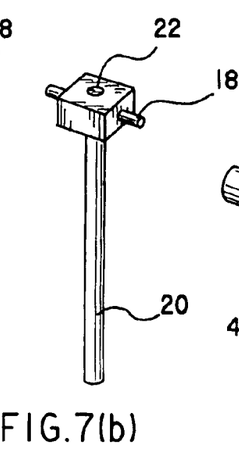
Figure 8:
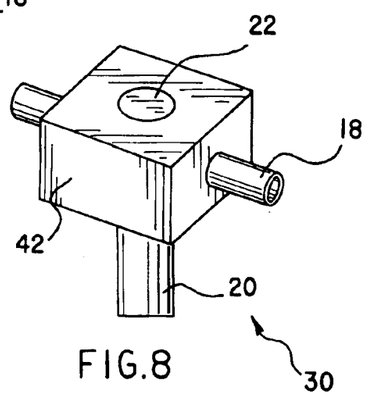
FIG. 8 illustrates a perspective view of an upper portion of an outer shaft according to the present invention.
Figure 10:
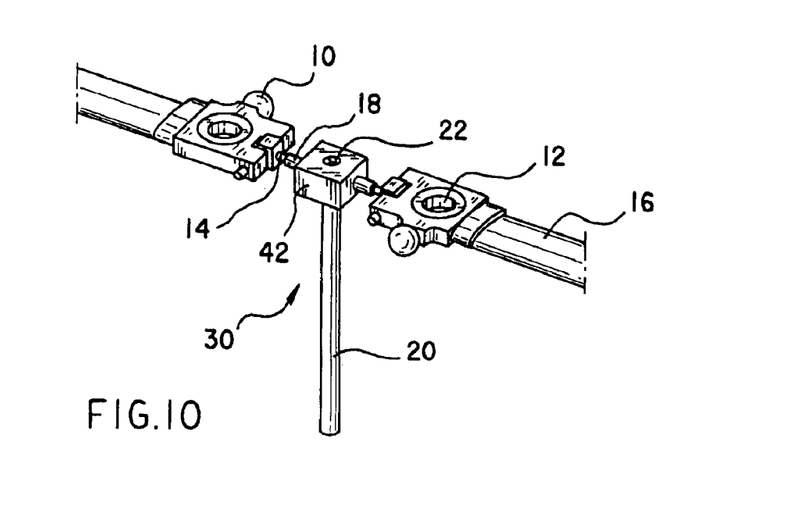
FIG. 10 illustrates one example of an outer shaft and blade joints according to the present invention.

FIGS. 7(a) and 7(b) show the flap driving shaft or outer shaft member of the present invention. The outer shaft member 30 rotates with the hub 2. To eliminate this rotation and simplify actuation, ball bearings can be attached to the shaft's lower end. A longitudinal portion 20 of the outer shaft member 30 can be inserted into the hub 2 through the linear bearing 6 and concentric with the hub. By this configuration, the outer shaft member 30 can be vertically movable with respect to the hub 2. When the outer shaft member 30 moves in the vertical direction, the outer shaft member 30 actuates the flapping motion of the blades 16. FIG. 8 illustrates an upper portion or head 42 of the outer shaft member 30. The head 42 has a hollow tube 18 perpendicular to the longitudinal portion 20 of the outer shaft member 30. The hollow tube 18 acts as a sleeve for the sliding pin 14 of the blade joint 8 as shown in FIG. 10. During the vertical motion of the outer shaft member 30, the sliding pin 14 operatively slides inside of the sleeve 18. As shown in FIG. 8, the head 42 of the outer shaft member 30 also includes an aperture 22 for receiving the inner shaft member 32.

Figure 9A:
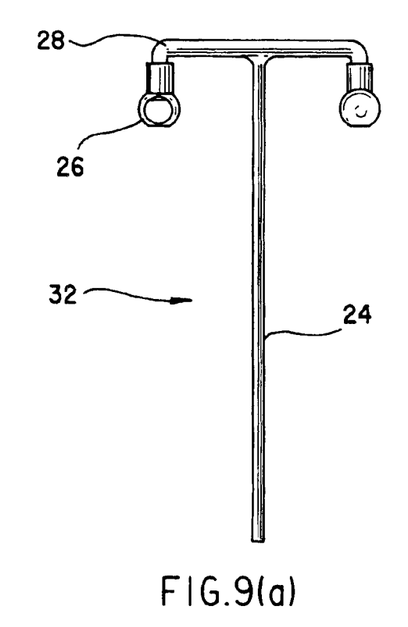
FIGS. 9(a) and 9(b) illustrates one example of an inner shaft member and pitch link according to the present invention.
Figure 9B:
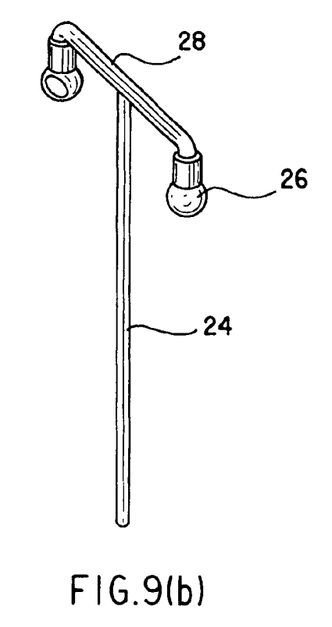

FIGS. 9(a) and 9(b) illustrate the pitch driving shaft or inner shaft member 32. The inner shaft member 32 rotates with the hub 2. To eliminate this rotation and simplify actuation, ball bearings can be attached to the shaft's lower end. The inner shaft member 32 can be T-shaped having an upper portion serving as a pitch link 28 and a lower elongated portion 24 being insertable into the outer shaft member 30. The inner shaft member 32 is concentric with the outer shaft member 30. Thus, the lower elongated portion 24 of the inner shaft member 32 slides inside or moves vertically with respect to the longitudinal portion 20 of the outer shaft member 30. When moved vertically, the inner shaft member 32 actuates the pitching motion of the blades 16. At opposite ends of the pitch link 28, the female portions 26 of the spherical joints are formed. The female portions 26 of the pitch link portion of the inner shaft member are disposed over and coupled to the spherical bolts 10 of the blade joints 8.

Figure 12:
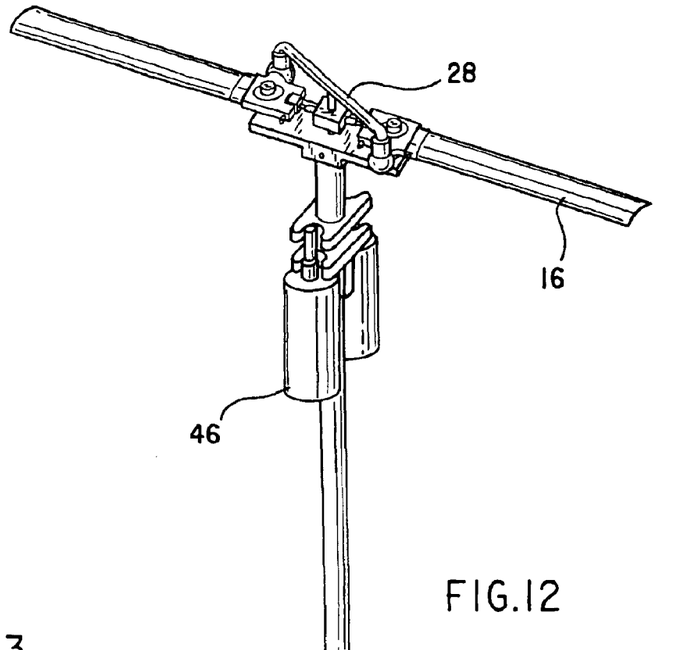
FIG. 12 illustrates a perspective view of a pitching and flapping mechanism according to the present invention.
Figure 15:
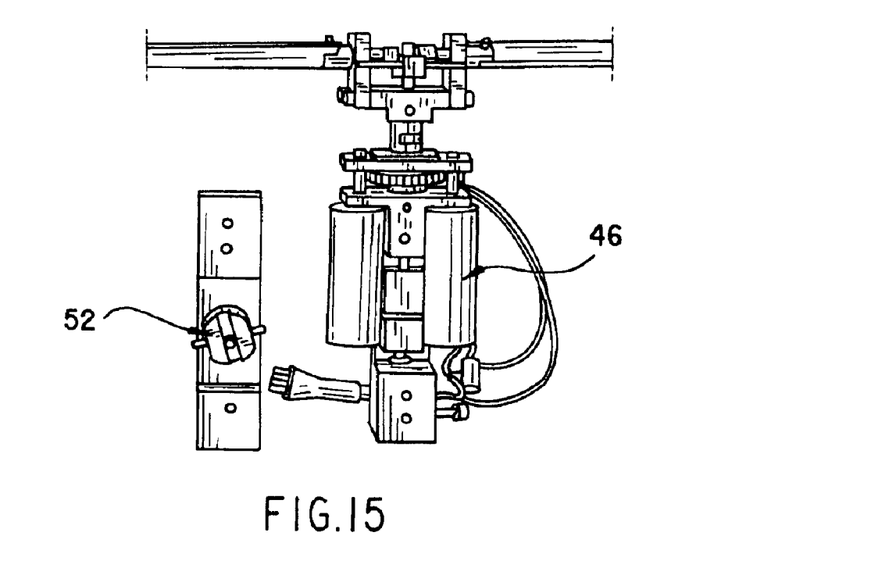
FIG. 15 shows a Scottish yoke mechanism that can actuate pitching according to the present invention.

The mechanism of the present invention allows the blades of a small-scale rotor to be actuated in the flap and pitch degrees of freedom. The rotor can be rotated by a motor 46 illustrated in FIGS. 12 and 15. The pitching and the flapping are completely independent from and uncoupled to each other. As such, the rotor can independently flap, or independently pitch, or flap and pitch simultaneously with different amplitudes and/or frequencies. The pitching or flapping can occur while the rotator is rotating or stopped. To achieve the pitching and flapping movement, the inner and outer shafts are actuated independently.

In order to find the appropriate combination of phase, amplitude, frequency and rotational speed that leads to enhancement in lift, the device requires uncoupled independent pitch and flap actuation systems to permit the complete mapping of the parameter space. In the rotary wing aircraft of the present invention, the phase shift between the flapping and the pitching oscillations can be adjusted from 0 to 360° over a wide range of rotational speeds, and the desired flapping and pitching amplitudes can be attained depending on the dimension of the mechanism. Linear displacements of the coaxial inner and outer shafts are translated into the flapping and pitching motion of the rotor blades.

Figure 17:
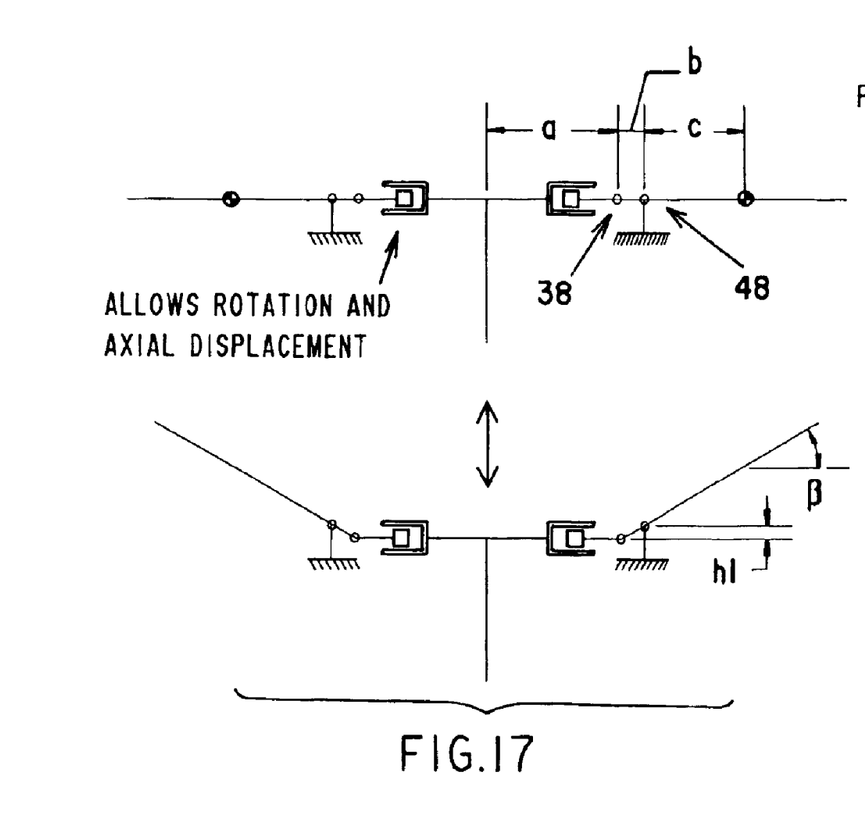
FIG. 17 is a schematic of a flapping mechanism according to the present invention.
Figure 18:
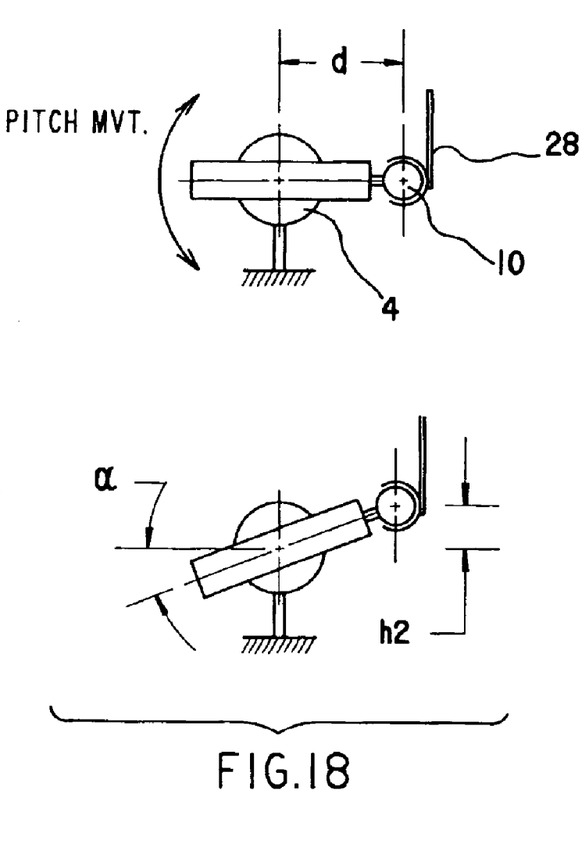
FIG. 18 is a schematic of a pitching mechanism according to the present invention.

Specifically, FIGS. 17 and 18 diagram the pitching and flapping mechanisms. The motion of the pitch and flap mechanisms can be discussed separately because they are independent and uncoupled.

In order to produce the flapping motion, the flap driving shaft or outer shaft member 32 can be connected to the flapping mechanism of the blade joint 8. The outer shaft member can be displaced in the vertical direction by an actuation stroke h1. See FIG. 17. The vertical displacement of the outer shaft member 30 away from the hub 2 causes the flapping mechanism 48 to be vertically displaced the distance of the actuation stroke, toward the hub 2, while the vertical displacement of the outer shaft member toward the hub causes the flapping mechanism 48 to be vertically displaced the distance of the actuation stroke, away from the hub. The relationship between angular displacement and actuation stroke depends on the distance between the hinge 38 and flapping mechanism 48. The angular rotation β of the blades to produce a flapping angle is a function of the actuation stroke $h_1$ such that:

$$\beta = \arcsin(h_1/b) \tag{1}$$

For example, in a prototype of one embodiment of the present invention, where a=12.2 mm, b=4.75 mm and c=38.12 mm, the total vertical displacement is 3.75 mm ($2h_1$). This gives a total angular rotation variation Δβ of 46.5°.

As discussed above, the pitch link 28 of the inner shaft member 32 is operatively connected to the spherical bolts 10 of the blade joint 8. Thus, in operation, when the inner shaft member 32 is actuated and vertically displaced away from the hub 2, the amplitude of the blades is increased. Conversely, when the inner shaft member 32 is actuated and vertically displaced toward the hub 2, the amplitude of the blades is decreased.

With respect to the pitching mechanism illustrated in FIG. 18, the distance d between the center of the ball joint 4 and the spherical bolt 10 determines the relationship between angular rotation a of the blade and actuation stroke $h_2$ $$\alpha = \arcsin(h_2/d) \tag{2}$$

For example, in a prototype of the present invention, where d=9.1 mm, and the total vertical displacement ($2h_2$) is 6.1 mm, the total possible angular variation is 40°. The blade can also be attached to the ball joint 4 such that the initial angle of attack can be set, and a desired variation around the mean angle of attack can be achieved. The relevant dimensions can be set to match the stroke and force requirements of a particular actuator.

Since small linear displacements are required for actuation of a pitching and flapping mechanism, the present invention can use, for example small electric motors. Alternatively, smart materials, actuators, pneumatic pistons, solenoids or the like can be used to actuate the pitching and flapping mechanism. In addition, actuation of the pitching and flapping mechanism can be accomplished by a small electric motor coupled with a Scottish yoke mechanism 52 that transforms the rotation of the motor into harmonic linear motion and actuates pitching. See FIG. 15. In order to provide the right amplitude, the offset distance between a pin that fits in the yoke slot and the motor shaft has to be accurately set. The resultant motion is harmonic and its frequency is directly proportional to the rotational speed of the motor. At low RPMs the motor might not be able to deliver the torque required, hence a reduction mechanism (planetary gearhead for example) should be used.

In order to make the device practical the energy saved by increasing the performance has to be smaller than the energy required to drive the mechanism. Ideally the system should be tuned to work as a mechanical resonator, in a similar way as insects manage their wing motion, minimizing the energy required to fly. Nature achieved efficient low Reynolds number flight so it is possible that biologically inspired machines may be the next step towards the development of more efficient and more versatile MAVs.

As discussed above, the present invention is capable of providing independent uncoupled motion in three 3 degrees of freedom and can operate over the wide spectrum of frequencies, amplitudes and phasing. For example, the mechanism of the present invention allows the blades of a small-scale rotor to be actuated in the flap, pitch, and rotational degrees of freedom. While the mechanism in the illustrated embodiment of the present invention is used in a rotor, the invention can also be used in different configurations. For example, the mechanism can be used in an ornithopter where no rotation occurs. Thus, the mechanism of the present invention offers greater flexibility in finding optimum flight conditions.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A biomimetic pitching and flapping mechanism comprising:
    a support member;
    an outer shaft member concentric with and supported within the support member;
    an inner shaft member concentric with and supported within the outer shaft member; and
    at least two blade joints for holding blades mounted on the support member, each of the at least two blade joints including a flapping member being coupled to the outer shaft member, and a pitching member being coupled to the inner shaft member, the flapping member and pitching member being uncoupled and actuated independently of each other.

2. The biomimetic pitching and flapping mechanism according to claim 1, wherein the support member comprises a hub including at least two ball joints fixed to an upper portion of the hub for mounting the at least two blade joints through apertures therein, and a linear bearing for supporting the outer shaft within the hub.

3. The biomimetic pitching and flapping mechanism according to claim 1, wherein the at least two blade joints further include a hinge on a first side and the pitching member being fixed to a second side adjacent the first side, the flapping member being connected to the hinge and extending from the first side, and the pitching member extending in a direction perpendicular to the flapping member.

4. The biomimetic pitching and flapping mechanism according to claim 3, wherein the pitching member comprises a spherical bolt and the flapping member comprises a sliding pin.

5. The biomimetic pitching and flapping mechanism according to claim 1, wherein the outer shaft member comprises an elongate section supported in the support member and a head section, the head section including at least two sleeves extending from opposite sides of the head section for receiving the flapping member, and an aperture for receiving the inner shaft member.

6. The biomimetic pitching and flapping mechanism according to claim 1, wherein the inner shaft member comprises an elongate section supported in the outer shaft member, a linking section perpendicular to the elongate section and at least two female ball joints disposed at opposite ends of the linking section.

7. The biomimetic pitching and flapping mechanism according to claim 1, wherein the inner shaft member comprises an elongate section that is slidingly engaged within the outer shaft member, and a linking section perpendicular to the elongate section having at least two female ball joints disposed at opposite ends, and wherein the at least two female ball joints are operatively connected to the pitching member.

8. The biomimetic pitching and flapping mechanism according to claim 7, wherein the outer shaft member comprises a head section and at least two sleeves extending from opposite sides of the head section, and wherein the flapping member is slidingly engaged within the sleeves.

9. The biomimetic pitching and flapping mechanism according to claim 3, wherein the pitching member of one of the at least two blade joints extends in a direction opposite from an extending direction of the pitching member of the other of the at least two blade joints.

10. The biomimetic pitching and flapping mechanism according to claim 1, wherein movement of the pitching member changes the pitch of the at least two blade joints and movement of the flapping member raises and lowers the at least two blade joints.

11. A biomimetic pitching and flapping mechanism comprising:
    supporting means for supporting at least two blade joints, each of the at least two blade joints including a flapping member for flapping the at least two blade joints and a pitching member for pitching the at least two blade joints, the flapping member and pitching member being uncoupled and actuated independently of each other;
    first moving means for moving the flapping member in a vertical direction;
    second moving means for moving the pitching member in an angular direction;
    first coupling means for coupling the flapping member to the first moving means; and
    second coupling means for coupling the pitching member to the second moving means.

12. A biomimetic pitching and flapping mechanism according to claim 11, further comprising mounting means for mounting the at least two blade joints onto the supporting means.

13. The biomimetic pitching and flapping mechanism according to claim 12, wherein the mounting means comprises ball joint spheres disposed on an upper portion of the supporting means.

14. The biomimetic pitching and flapping mechanism according to claim 11, wherein the flapping member comprises an extending pin on the at least two blade joints slidingly engaged in a sleeve on the outer shaft member and wherein the pitching member comprises a spherical bolt on the at least two blade joints rotatingly engaged in a female part of the inner shaft member.

15. The biomimetic pitching and flapping mechanism according to claim 14, wherein the spherical bolt of one of the at least two blade joints extends in a direction adjacent to an extending direction of the extending pin.

16. A biomimetic pitching and flapping mechanism comprising:
- a support member;
- an outer shaft member concentric with and supported within the support member;
- an inner shaft member concentric with and supported within the outer shaft member; and
- at least two blade joints for holding blades, mounted on the support member, each of the at least two blade joints including a first moving member coupled to the outer shaft member for lifting the at least two blades joints, and a second moving member coupled to the inner shaft member for tilting the at least two blade joints, the first moving member and the second moving member being uncoupled and actuated independently of each other.

17. The biomimetic pitching and flapping mechanism according to claim 16, wherein movement of the first moving member causes the blades to flap and movement of the second moving member changes a pitch of the blades.

18. The biomimetic pitching and flapping mechanism according to claim 1, wherein a coupling of one of the at least two blade joints to the inner shaft member provides a pitching degree of freedom to the blades.

19. The biomimetic pitching and flapping mechanism according to claim 1, wherein a coupling of the at least two blade joints to the outer shaft member provides a flapping degree of freedom to the blades.

20. The biomimetic pitching and flapping mechanism according to claim 1, wherein a concentricity of the hub, inner shaft member and outer shaft member provide a rotational degree of freedom to the blades.

* * * * *